(12) United States Patent
Droesbeke et al.

(10) Patent No.: US 9,772,454 B2
(45) Date of Patent: Sep. 26, 2017

(54) FERRULE FOR AN OPTICAL CONNECTOR (71) Applicant: FCI Asia Pte. Ltd., Singapore (SG)

(72) Inventors: Gert Julien Droesbeke, Besancon (FR); Ulrich Dieter Felix Kell, Besancon (FR); Michael Richter, Besancon (FR); Alexander Eichler-Neumann, Besancon (FR); Sven Klinknicht, Besancon (FR)

(73) Assignee: FCI Asia Pte. Ltd., KA Place (SG)

( * ) Notice: Subject to any disclaimer, the term of this patent is extended or adjusted under 35 U.S.C. 154(b) by 0 days.

(21) Appl. No.: 14/786,611

(22) PCT Filed: Apr. 23, 2013

(86) PCT No.: PCT/IB2013/001132
§ 371 (c)(1),
(2) Date: Oct. 23, 2015

(87) PCT Pub. No.: WO2014/174333
PCT Pub. Date: Oct. 30, 2014

(65) Prior Publication Data
US 2016/0085033 A1 Mar. 24, 2016

(51) Int. Cl.
*G02B 6/36* (2006.01)
*G02B 6/40* (2006.01)
(Continued)

(52) U.S. Cl.
CPC ........... *G02B 6/3861* (2013.01); *G02B 6/245* (2013.01); *G02B 6/3839* (2013.01);
(Continued)

(58) Field of Classification Search
None
See application file for complete search history.

(56) References Cited

U.S. PATENT DOCUMENTS 5,113,460 A * 5/1992 Hakoun .................. G02B 6/30
385/39
5,528,713 A * 6/1996 Dannoux ................ G02B 6/30
385/49
(Continued)

FOREIGN PATENT DOCUMENTS

CN 1251904 A 5/2000
JP 2007-041222 A 2/2007
(Continued)

OTHER PUBLICATIONS

International Search Report and Written Opinion for International Application No. PCT/IB2013/001132 mailed Dec. 17, 2013.
(Continued)

*Primary Examiner* — Michelle R Connelly
(74) *Attorney, Agent, or Firm* — Wolf, Greenfield & Sacks, P.C.

(57) ABSTRACT

Ferrule for an optical connector, an optical connector containing such a ferrule, and a method for assembling such a ferrule. The ferrule includes a base, at least one cover, at least one fiber section running through a channel between the base and the cover from a cable connection side to an opposite contact face exposing distal ends of the fiber sections. The fibers are adhered to the base and/or to the cover at a bonding section at a distance from the contact face.

19 Claims, 6 Drawing Sheets

(51) Int. Cl.
*G02B 6/38* (2006.01)
*G02B 6/245* (2006.01)

(52) U.S. Cl.
CPC ......... *G02B 6/3847* (2013.01); *G02B 6/3881* (2013.01); *G02B 6/3882* (2013.01)

(56) References Cited

U.S. PATENT DOCUMENTS

| | | | | |
|---|---|---|---|---|
| 6,873,770 | B2* | 3/2005 | Leung | G02B 6/3636 385/137 |
| 7,103,256 | B2* | 9/2006 | Song | G02B 6/3636 385/137 |
| 7,603,021 | B2* | 10/2009 | Watanabe | G02B 6/30 385/137 |
| 2002/0146216 | A1* | 10/2002 | Schofield | G02B 6/3839 385/83 |
| 2003/0091297 | A1* | 5/2003 | Hung | G02B 6/3839 385/83 |

FOREIGN PATENT DOCUMENTS

| | | |
|---|---|---|
| JP | 2010-128112 | 6/2010 |
| WO | WO 2012/174221 A2 | 12/2012 |

OTHER PUBLICATIONS

International Preliminary Report on Patentability for International Application No. PCT/IB2013/001132 mailed Nov. 5, 2015.

\* cited by examiner

FERRULE FOR AN OPTICAL CONNECTOR

RELATED APPLICATIONS

This application is the U.S. National Stage of and claims priority to and the benefit of International Patent Application Number PCT/IB2013/001132, entitled "FERRULE FOR AN OPTICAL CONNECTOR" filed on Apr. 23, 2013, which is herein incorporated by reference in its entirety.

FIELD OF INVENTION

The present invention relates a to a ferrule for an optical connector, to an optical connector containing such a ferrule, and to a method for assembling such a ferrule.

BACKGROUND

Optical connectors hold and present terminal ends of cabled optical fibers for optical communication with a complementary receiver connector. For effective fiber optic communication the optical connector should axially align the presented fiber ends with associated optical elements of the receiver connector to which the optical connector is mated. These associated optical receiver element can for example include further optical fibers, or lenses or similar components, such as lenses of a light guide for transferring optical signals to processing units, such as PIN photo diodes, VCEL's or similar opto-electric or optical components.

Optical connectors typically include a ferrule holding and presenting the optical fiber ends for optical contacting the fiber ends with the associated optical components of the receiver connector. Assembling a ferrule typically involves stripping the coating from the fiber ends, advancing the stripped fiber ends through respective openings in the ferrule until the distal fiber ends protrude beyond a contact face of the ferrule. The fibers are secured within the ferrule by gluing. The protruding distal fiber ends are then cleaved and polished to create coplanar convex contact faces.

Ferrules are typically bulky and expensive components. The required cleaving and polishing steps are time-consuming and laborious processes and must be performed accurately. Ferrules are generally sensitive for contamination, e.g., by moisture or dirt, and damaging of the optical fiber ends.

Therefore, a need exists for a compact and low cost ferrule for an optical cable connector enabling reliable optical communication with a complementary receiver connector.

SUMMARY OF THE DISCLOSURE

A ferrule is disclosed comprising a base, at least one cover and at least one row of fiber sections extending through channels between the base and the cover from a cable connection side to an opposite contact face exposing distal ends of the fiber sections. The fiber sections are adhered to the base and/or to the cover over a bonding section at a distance from the contact face. This way, no glue or adhesive is present near the distal contact ends of the fibers. The fibers can be cleaved after adhering them to the respective part of the ferrule and no additional polishing is needed.

In a specific embodiment, a glue barrier separates the bonding section from an adhesive-free section at the contact face. The glue barrier may for instance include a slot extending parallel to the contact face.

Grooves guiding the fibers ends may be present between the contact face and the glue barrier slot. The grooves may form a tight fit with the fiber ends, while the space between the cover and the base part may provide a clearance fit between the glue barrier slot and the bonding section.

For accurately positioning the fibers the bonding section may be provided with a series of parallel grooves individually receiving a respective fiber.

The glue barrier slot and/or the fiber receiving grooves can for example be positioned in a surface of the cover facing the base part.

The fiber sections are stripped at the adhesive-free section but may for instance remain non-stripped and still coated at the bonding section.

In a specific embodiment, the ferrule may comprise two covers and two rows of fibers ends sandwiched between the base part and a respective cover. This allows a symmetrical built-up of the ferrule. The two covers can be identical and be made with the same moulds.

The ferrule may for example comprise alignment pegs and complementary openings for aligning the one or more covers relative to the base part.

The covers of the ferrule can be recessed relative to the base part at the contact face. This way, a ferrule is obtained holding at least one row of fiber sections extending from a cable connection side to a contact face with at least one recessed section exposing sunk distal ends of the fiber sections. Since the fiber ends are in a recessed part of the contact face, they do not physically contact the signal receiving components of the complementary connector. The optical signals are transferred via an air gap of an accurately dimensioned width. In this configuration the fiber ends do not need to be polished. Moreover, positioning the distal fiber ends in a recessed part of the contact face protects the cleaved fiber ends against mechanical damage.

In a further aspect, a method is disclosed for assembling the disclosed ferrule. In a first step, the fibers ends of an optical cable are arranged in a line and distal ends of the fiber ends are stripped, while the rest of the fibers remains coated. The coated sections are glued onto a bonding section of a cover. The stripped sections are arranged at an adhesive free section of the cover and cleaved to become coplanar with the contact face of the cover. The fiber ends are then sandwiched between the cover and the base part.

Optionally, the fiber ends are first arranged in a line by a gauge having alignment grooves for positioning the fiber ends. The gauge may be removed after curing of the glue.

BRIEF DESCRIPTION OF THE DRAWINGS

An exemplary embodiment of the connector will be further explained under reference to the accompanying drawing.

DETAILED DESCRIPTION OF EMBODIMENTS

Figure 1:
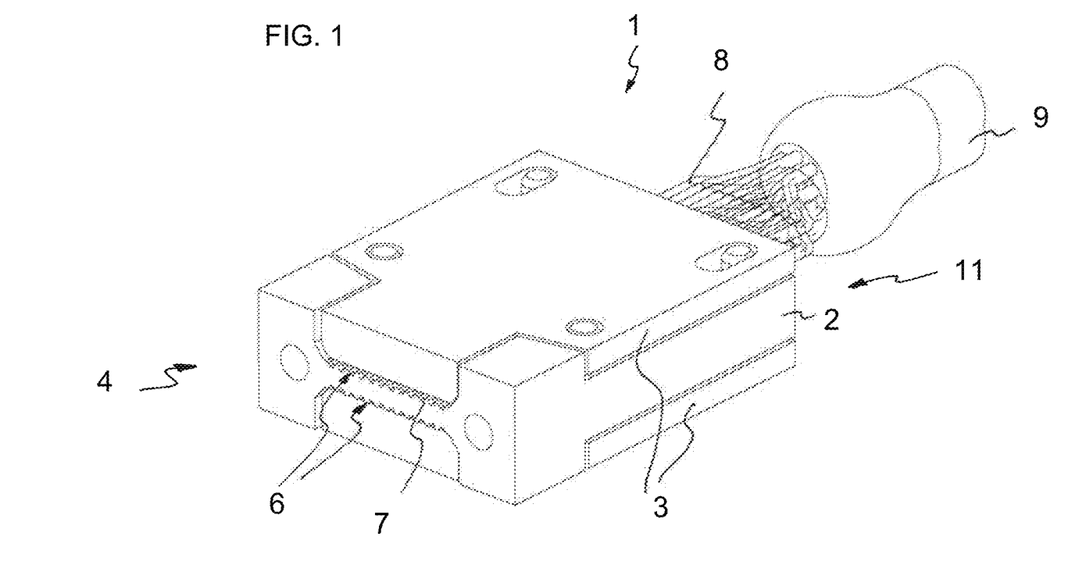
FIG. 1: shows in perspective view an exemplary embodiment of a ferrule.
Figure 2:
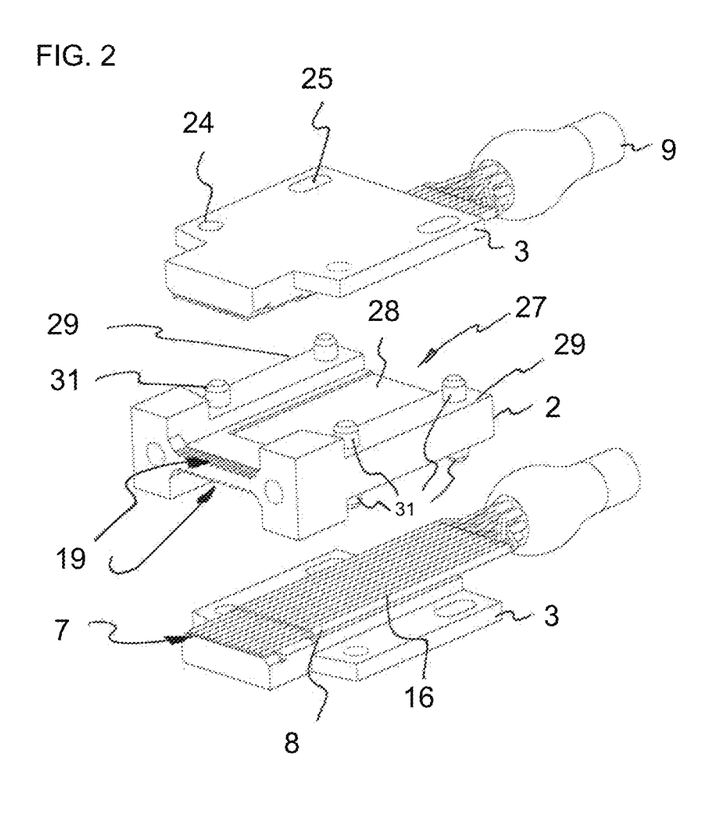
FIG. 2: shows the ferrule of FIG. 1 in exploded view.

FIGS. 1 and 2 show a ferrule 1 comprising a base 2 between two covers 3. The ferrule 1 has a contact face 4 presenting two rows 6 of unpolished distal ends 7 of fibers 8 from two optical cables 9 at a cable connection side 11 of the ferrule 1. The fibers 8 are sandwiched between the base 2 and a respective cover 3.

In the shown exemplary embodiment, the fibers are held by a round cable with a sheath which is removed at the outer end to expose the fiber ends. The fibers have a cylindrical core in a cylindrical coating. The distal ends of the fibers are stripped, such that the coating has been removed to expose the bare core. In other embodiments, other types of cable can be used, such as ribbon cables.

Figure 3:
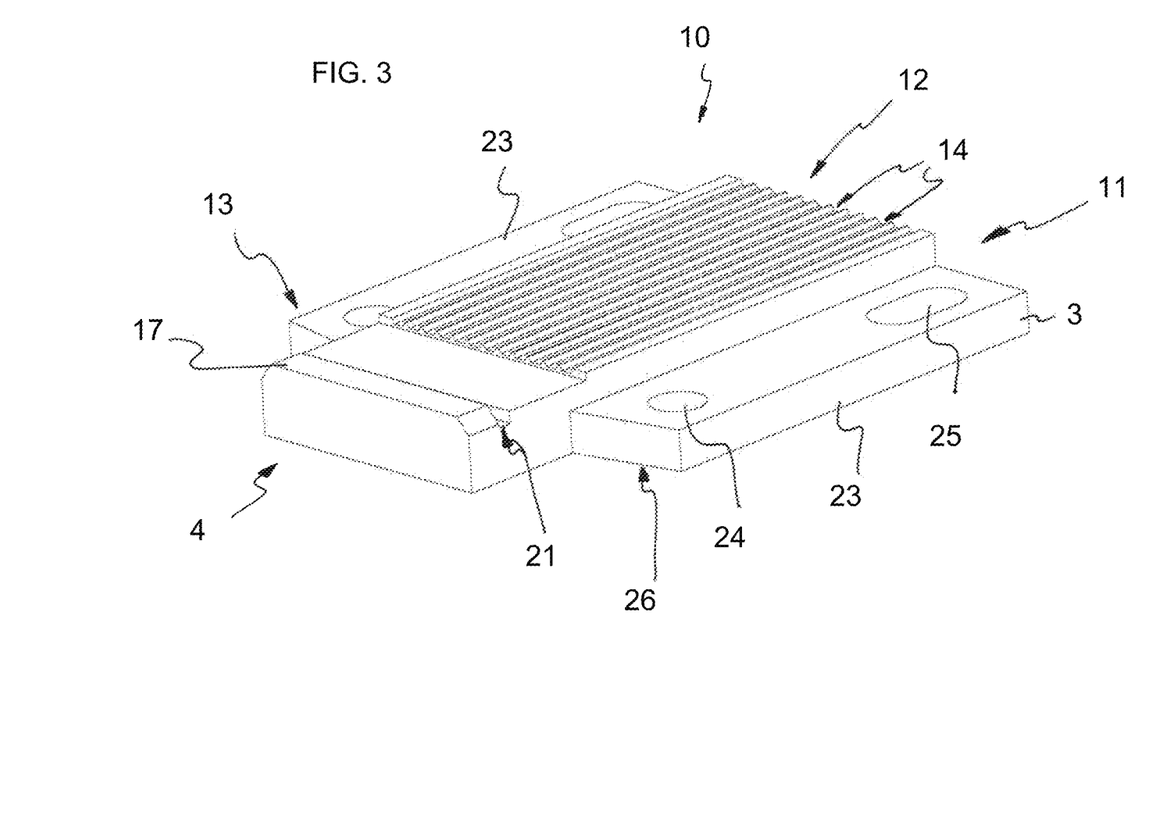
FIG. 3: shows a cover of the ferrule of FIG. 1.

FIG. 3 shows a cover 3 with the surface 10 facing the base 2 when the ferrule 1 is assembled, turned upwardly. The surface 10 comprises a bonding section 12, extending from the cable connection side 11 to an adhesive-free section 13 of the surface 10. The bonding section 12 is formed by a series of parallel equidistantly arranged grooves 14, dimensioned to individually receive and align a coated (not stripped) section 16 of a respective fiber 8 (see FIG. 2). At the contact face 4, the adhesive free section 13 comprises a ridge 17 (see also FIG. 9) supporting stripped distal ends 18 of the fibers 8. Opposite to the ridge 17 the opposite section of the base 2 comprises parallel grooves 19 the stripped ends 18 of the fibers 8 with a tight fit. At the side opposite to the contact face 4 the ridge 17 is bordered by a glue barrier slot 21. Between the glue barrier slot 21 and the bonding section 12 a clearance 22 contributes to further separation of the bonding section 12 and the ridge 17.

At two opposite sides parallel to the grooves 14 the cover 3 comprises a strip 23 with a circular alignment hole 24 near the contact face 4, and an alignment slot 25 near the cable connection side 11. At the cable connection side 11 the strips 23 are flush with the bonding section 12. In the direction of the contact face 4, the strips 23 have a recessed and chamfered side 26. The thickness of the strips 23 is less than the thickness of the bonding section 12, which is flush with the strips 23 at the face opposite to the surface 10 with the fiber alignment grooves 14.

The two covers 3 are identically shaped and sized and can be made with the same moulds. The base 2 comprises two identical cover receiving surfaces 27 having a recessed middle part 28 for receiving the respective bonding sections 12 and the fiber sections 8. At the contact face 4, the middle part 28 of the base 2 comprises the alignment grooves 19 for accurately aligning the stripped distal fiber ends 18. The middle part 28 of the base 2 is flanked by a pair of side edges 29 which are thicker than the middle part 28. The side edges 29 are provided with alignment pegs 31 dimensioned to cooperate with the alignment holes and slots 24, 25 of the covers 3 to align the covers 3 when they are attached to the base 2. The opposed surfaces of the cover 3 and the base 2 are complementary and form a matching fit enabling accurate alignment of the distal fiber ends 18 at the contact face 4 of the ferrule 1.

At the contact face 4 of the ferrule 1 the covers 3 are recessed relative to the base part 2. This creates a recessed part 5 of the contact face 4 the extending part of the base 2 protects the exposed fiber ends 7.

Figures 4, 5:
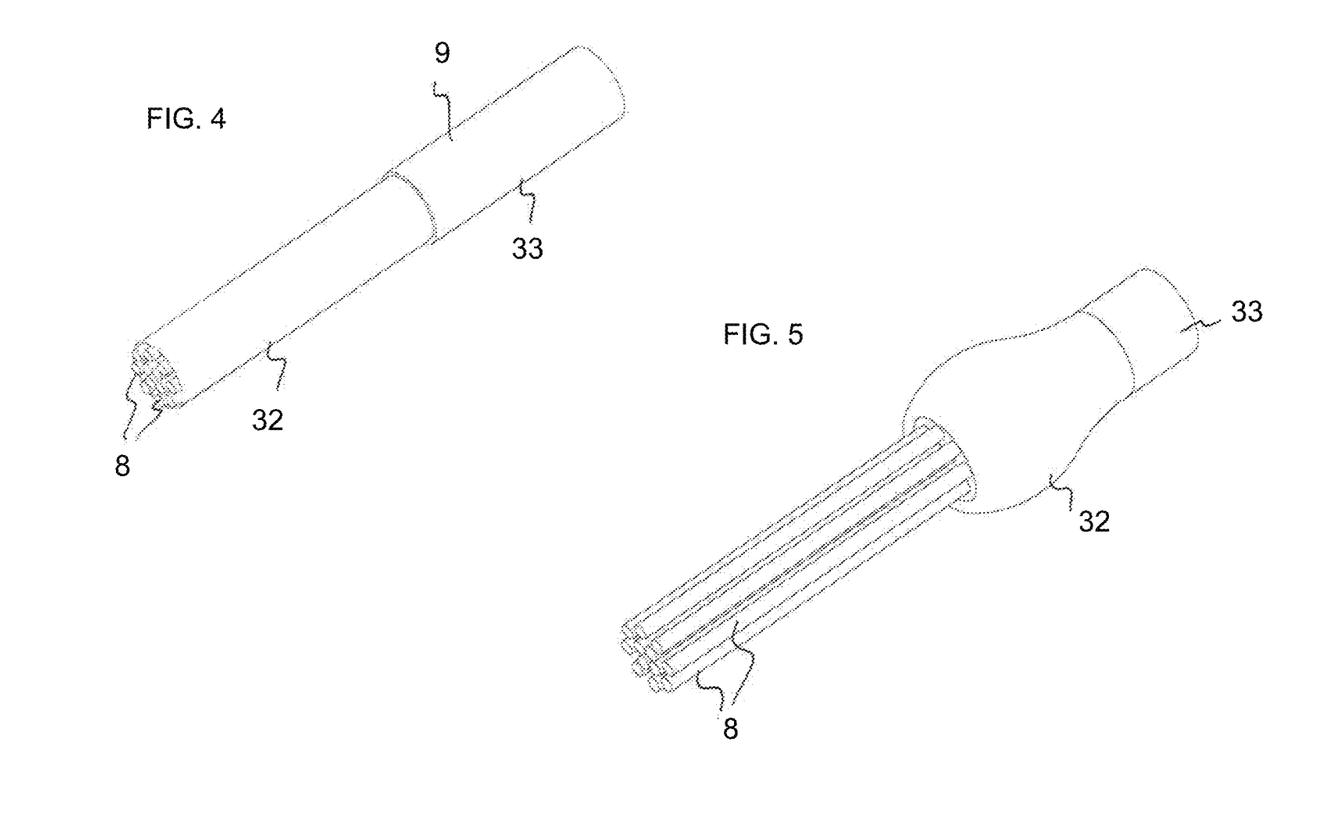
FIG. 4: shows a distal end of an optical cable.
FIG. 5: shows the cable of FIG. 4 in a first step of a method for assembling the ferrule of FIG. 1.

The ferrule 1 can be used with any type of cable, including ribbon cables or round cables. FIG. 4 shows an example of such a cable 9, comprising a bundle of optical fibers 8 sheathed in an inner sleeve 32, for instance a polyaramid sleeve, and an outer jacket 33. To assemble the ferrule 1 using a round optical cable 9, the outer jacket 33 is first stripped from the terminal end of the cable 9. Subsequently, the inner sleeve 32 is folded backwards to expose the individual fibers 8, as shown in FIG. 5.

Figures 6, 7:
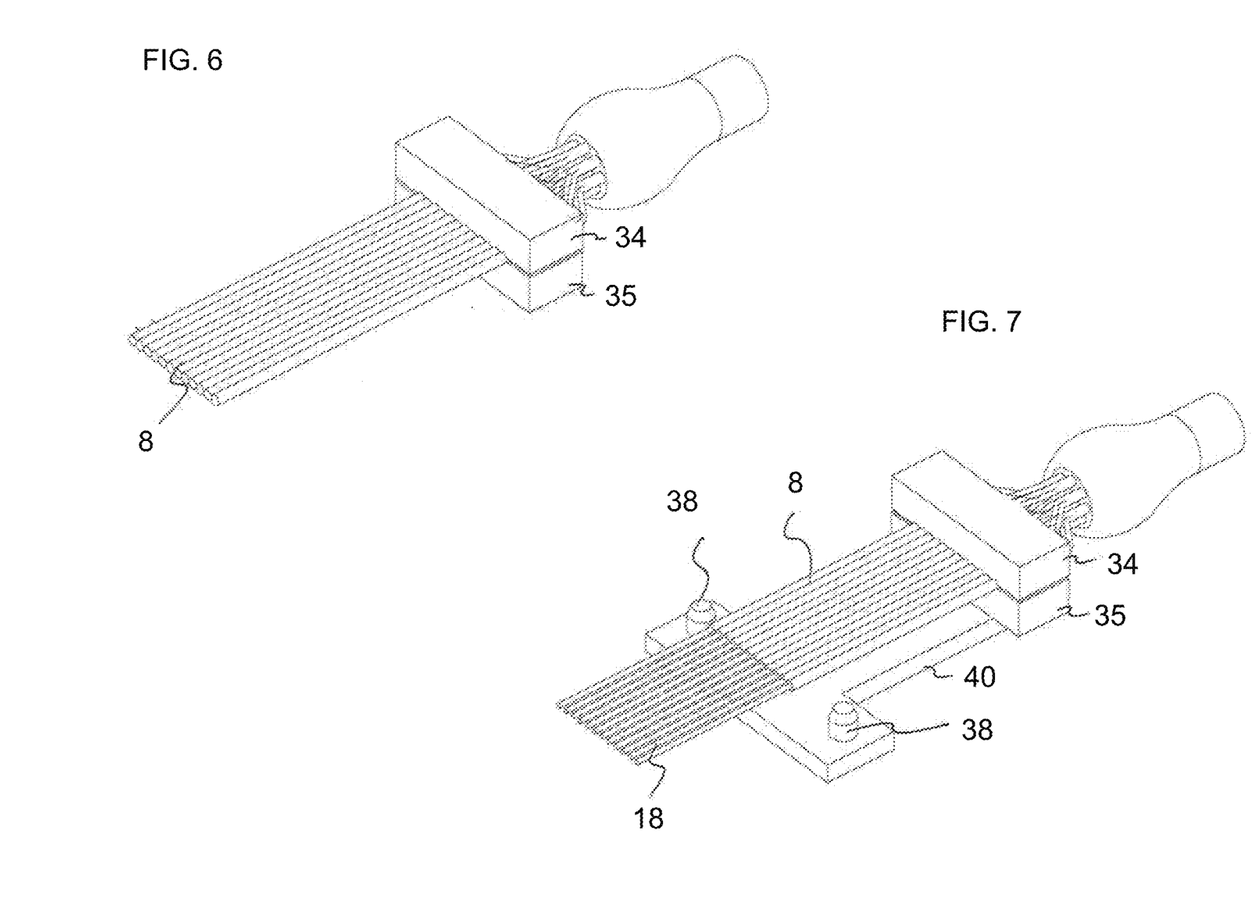
FIG. 6: shows a first step of a method for assembling the ferrule of FIG. 1.
FIG. 7: shows a second step of a method for assembling the ferrule of FIG. 1.

For the subsequent steps, a gauge or jig 36 is used comprising an upper clamp 34, a lower clamp 35 and a T-shaped front support 40 next to but separate from the lower clamp 35. The exposed fiber ends are first positioned between the upper clamp 34 and a lower clamp 35 of the gauge 36, as shown in FIG. 6. Subsequently, the fiber ends are stripped and cleaned. In a next step, the support 40 is positioned below the planned position of the cover, as shown in FIG. 7. The support 40 comprises a distal end 37 with alignment pegs 38 flanking the fiber ends 8, and an alignment end with an alignment block 39 having a height corresponding to the thickness of the bonding section 12 of the cover 3. The upper part 34 of the gauge 36 only faces the alignment block 39 of the lower part 35. The opposed faces of the upper part 34 and the alignment block 39 comprise alignment grooves (not shown) spreading the fibers 8 equidistantly in a row.

During stripping the upper and lower parts 34, 35 of the gauge are clamped onto each other, e.g., by means of magnets (not shown). The stripped fiber ends 18 may for example have a diameter of 120-130 μm, while the coated fiber sections 16, which are not stripped, have a diameter which is about twice the diameter of the stripped sections 18. The fiber sections 16 between the cable sheath 32 and the stripped distal ends 18 are not stripped and remain coated.

Figure 8:
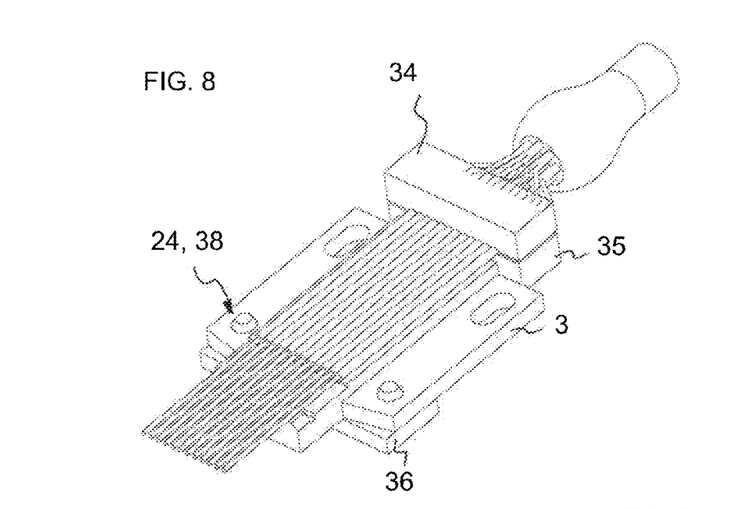
FIG. 8: shows a third step of a method for assembling the ferrule of FIG. 1.

In a next step, shown in FIG. 8, a cover 3 is positioned between the aligned fibers 8 and the lower part 35 of the gauge 36 in such a way that the alignment pegs 38 of the lower gauge part 35 are received in the circular alignment openings 24 in the cover 3. The coated fiber sections 16 which are not stripped rest in the alignment grooves 14 of the bonding section 12 of the cover 3. The fibers 8 are now accurately aligned and a glue, such as a heat curable or UV curable epoxy adhesive, can be applied over the coated, not stripped sections 16 of the fibers 8. After curing, the gauge 36 can be removed.

Figure 9:
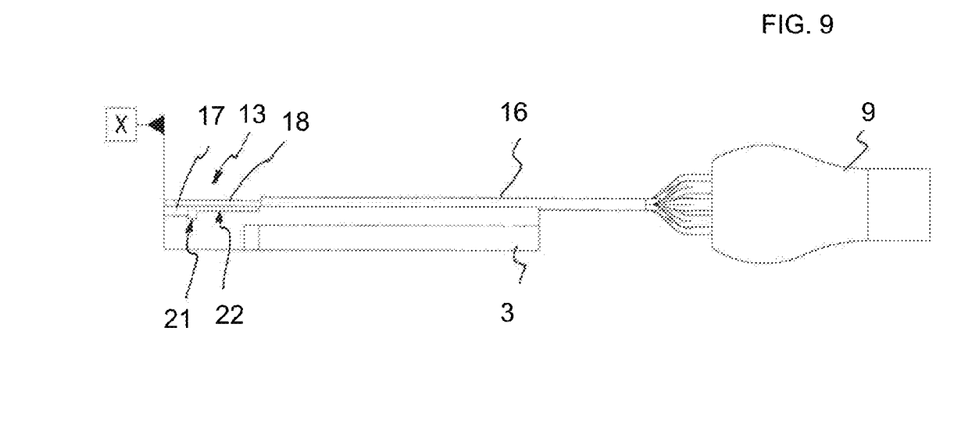
FIG. 9: shows a cleaving step of a method for assembling the ferrule of FIG. 1.

The stripped distal fiber ends 18 protrude from the contact face 4 of the cover 3. The protruding parts of the distal fiber ends 18 are removed by cleaving. To obtain a flat and smooth cleavage surface, first a scratch is made at one side of the fiber. Subsequently a shear force is exerted to the opposite side of the fiber until the distal end breaks off. The stripped distal fiber ends are now coplanar with the contact face 4 of the cover 3, as shown in FIG. 9.

The invention claimed is:
1. A ferrule comprising:
a base,
a cover, and
a plurality of fibers with sections running through channels between the base and the cover from a cable connection side to an opposite contact face exposing distal ends of the fiber sections,
wherein the fibers are adhered to the base and/or to the cover at a bonding section at a distance from the contact face,
wherein a glue barrier separates the bonding section from an adhesive-free section at the contact face;
wherein the base comprises a surface forming a portion of the contact face and side edges and a recessed portion between the side edges, the recessed portion cooperating with the cover to form the channels; and
wherein the cover comprises side portions mechanically coupled to the base at the side edges, and the side portions have edges facing the contact surface that are separated from the contact face by portions of the base.

2. A ferrule according to claim 1, wherein the glue barrier includes a slot extending parallel to the contact face.

3. A ferrule according to claim 2 wherein the width of the channels guiding the fibers ends forms a tight fit with the fiber ends between the contact face and the glue barrier slot, and a clearance fit between the glue barrier slot and the bonding section.

4. A ferrule according to claim 2 wherein the glue barrier slot and/or the fiber receiving grooves are positioned in a surface of the cover facing the base part, and wherein the bonding section comprises a series of parallel grooves individually receiving a respective fiber.

5. A ferrule according to claim 1 wherein the channels comprise sections extending between the contact face and the glue barrier, these sections being formed by V-shaped grooves in one part and a flat surface of a second part capping the V-shaped grooves.

6. A ferrule according to claim 1 comprising at least one row of fiber sections running through respective channels between the base and the cover.

7. A ferrule according claim 1 wherein the bonding section comprises a series of parallel grooves individually receiving a respective fiber.

8. A ferrule according to claim 1 wherein the fibers are stripped at the adhesive-free section and not stripped at the bonding section.

9. A ferrule according to claim 1 wherein:
the cover is a first cover,
the plurality of fibers have exposed distal ends in the contact surface in a first row,
and the ferrule further comprises:
    a second cover, on an opposite side of base from the first cover,
    a second plurality of fibers having exposed distal ends in the contact surface in a second row, such that two rows of fibers ends are sandwiched between the base part and the first and second covers.

10. A ferrule according to claim 1 wherein the fiber ends have unpolished terminal ends.

11. A ferrule according to claim 1 comprising alignment pegs on the side edges of the base and complementary openings on the side portions receiving the pegs for aligning the one or more covers relative to the base part.

12. An optical cable connector comprising a ferrule according to claim 1.

13. A ferrule comprising a base, at least one cover, and at least one fiber section running through a channel between the base and the cover from a cable connection side to an opposite contact face exposing distal ends of the fiber sections,
wherein the fibers are adhered to the base and/or to the cover at a bonding section at a distance from the contact face, and
wherein the fiber ends are arranged in a recessed part of the contact face.

14. A ferrule according to claim 13 wherein the one or more covers are recessed relative to the base part at the contact face to form the recessed part.

15. A ferrule comprising a base, at least one cover, at least one fiber section running through a channel between the base and the cover from a cable connection side to an opposite contact face eposing distal ends of the fiber sections,
wherein the fibers are adhered to the base and/or to the cover at a bonding section at a distance from the contact face, and
wherein the ferrule holds at least one fiber section extending from the cable connection side to the contact face with at least one recessed section exposing sunk distal ends of the at least one fiber sections.

16. A method of assembling a ferrule comprising a base, at least one cover, and at least one fiber section running through a channel between the base and the cover from a cable connection side to an opposite contact face exposing distal ends of the fiber sections, wherein the fibers are adhered to the base and/or to the cover at a bonding section at a distance from the contact face, the method comprising:
arranging the fiber ends in a line by a gauge having alignment grooves for positioning the fiber ends;
curing of the glue then removing the gauge, and thereafter:
    gluing the fiber ends of an optical cable onto a bonding section of a cover,
    the fiber ends to become coplanar with the contact face,
wherein the fiber ends are sandwiched between the cover and the base part.

17. A method according to claim 16 wherein the fiber ends are stripped before gluing, while the rest of the fibers remain coated, wherein the coated sections of the fiber ends are glued onto the bonding section.

18. A method according to claim 16, further comprising:
mechanically coupling the cover, with fibers glued thereto, to the base at side edges of the base and side portions of the cover that are separated from the contact face by a portion of the at base.

19. A method according to claim 16, further comprising:
using the ferrule without polishing the exposed fiber ends.

* * * * *

UNITED STATES PATENT AND TRADEMARK OFFICE
CERTIFICATE OF CORRECTION

PATENT NO. : 9,772,454 B2
APPLICATION NO. : 14/786611
DATED : September 26, 2017
INVENTOR(S) : Gert Julien Droesbeke et al.

Page 1 of 1

It is certified that error appears in the above-identified patent and that said Letters Patent is hereby corrected as shown below:

In the Claims

Claim 15, Column 6, Line 15:
opposite contact face eposing distal ends of the fiber sec-
Should read:
opposite contact face exposing distal ends of the fiber sec- Claim 18, Column 6, Line 49:
face by a portion of the at base
Should read:
face by a portion of the base Signed and Sealed this
Twenty-fourth Day of July, 2018

Andrei Iancu
*Director of the United States Patent and Trademark Office*